(12) United States Patent
Kuo et al.

(10) Patent No.: US 6,418,440 B1
(45) Date of Patent: Jul. 9, 2002

(54) SYSTEM AND METHOD FOR PERFORMING AUTOMATED DYNAMIC DIALOGUE GENERATION

(75) Inventors: Hong-Kwang Jeff Kuo, New Providence; Chin-Hui Lee, Basking Ridge; Andrew Nason Pargellis, Hoboken, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/334,000

(22) Filed: Jun. 15, 1999

(51) Int. Cl.[7] .............................................. G06F 17/30
(52) U.S. Cl. ............................ 707/10; 704/2; 704/200
(58) Field of Search ........................ 707/1–7; 704/1–4, 704/9–10, 200, 208, 231, 246, 257, 270, 275

(56) References Cited

U.S. PATENT DOCUMENTS

| | | | |
|---|---|---|---|
| 4,688,195 A | | 8/1987 | Thompson et al. ......... 364/300 |
| 5,694,558 A | | 12/1997 | Sparks et al. ............... 395/326 |
| 5,748,841 A | | 5/1998 | Morin et al. ................ 395/2.66 |
| 5,774,860 A | | 6/1998 | Bayya et al. ................ 704/275 |
| 5,860,059 A | * | 1/1999 | Aust et al. .................. 704/231 |
| 5,886,643 A | * | 3/1999 | Diebboll et al. ........ 340/825.08 |
| 5,937,422 A | * | 8/1999 | Nelson et al. ............... 707/531 |
| 6,044,347 A | * | 3/2000 | Abella et al. ................ 704/272 |
| 6,065,117 A | * | 5/2000 | White ......................... 713/159 |
| 6,081,780 A | * | 6/2000 | Lumelsky .................... 704/260 |
| 6,219,643 B1 | * | 4/2001 | Cohen et al. ................ 704/257 |
| 6,236,968 B1 | * | 5/2001 | Kanevsky et al. .......... 704/275 |
| 6,246,981 B1 | * | 6/2001 | Papineni et al. ............ 704/235 |
| 6,275,225 B1 | * | 8/2001 | Rangarajan et al. ........ 345/333 |

FOREIGN PATENT DOCUMENTS

| | | |
|---|---|---|
| EP | 0749 081 | 12/1996 |
| EP | 0848 338 | 6/1998 |

OTHER PUBLICATIONS

"A Langugage For Creating Speech Applications" by Andrew Pargellis, Qiru Zhou, Antoine Saad, Chin–Hui Lee, 5th International Conference on Spoken Language Processing, Sydney Convention and Exhibition Centre 30 Nov.4,–Dec., 1998, pp. 1619–1622.

Thomas, CH G et al., "Using Agents to Personalize The Web", IUI International Conf. On Intelligent User Interfaces, pp. 53–60 (1997).

Quintana, Y., "Knowledge–Based Information Filtering of Financial Information", Proceedings of the National Online Meeting, pp. 279–285 (1997).

Ukelson, J. et al., "A dialogue Manager for Efficient adaptive Man–Machine Dialogues", Proceedings of the Annual International Computer Software and Applications conference, pp. 588–595 (1989).

* cited by examiner

*Primary Examiner*—James P. Trammell
*Assistant Examiner*—Mary Wang
(74) *Attorney, Agent, or Firm*—Kenneth M. Brown

(57) ABSTRACT

A customized method or algorithm for holding an interactive dialogue session between a (human) user and a machine (hereinafter referred to simply as a "dialogue") is generated, such that the resulting dialogue advantageously responds to the user's requests and wherein the system's capability (i.e., the dialogue) is automatically modified thereafter based on dynamically changing external databases. Specifically, a computer system acts as a Dialogue Generator agent by creating such a customized dialogue consisting of services that are organized and presented in a form that is a combination of the user's expectations and the system's capabilities. In particular, the system's capabilities advantageously include the information content of database/service providers (such as, for example, a distributed information source such as the World Wide Web or a corporate file system), and the Dialogue Generator advantageously modifies the dialogue periodically in response to this dynamically changing external environment.

45 Claims, 3 Drawing Sheets

SYSTEM AND METHOD FOR PERFORMING AUTOMATED DYNAMIC DIALOGUE GENERATION

FIELD OF THE INVENTION

The present invention relates generally to interactive dialogue systems for human-machine communication, and more particularly to the automated generation of dialogues for such systems.

BACKGROUND OF THE INVENTION

Recently, there has been a growing interest in the general area of dialogue systems for human-machine communications. In such a system, the human, or "user," interacts with the computer through one or more of the following mechanisms: typing responses and/or queries using a keyboard; speaking into an audio input device (in which case the system includes a "speech recognizer" for converting the user-supplied audio input into words, represented, for example, in the form of text); and using a mouse to select objects (such as, for example, words or phrases) on a computer screen. Any such system requires a module commonly referred to as a dialogue manager that defines a means for the computer system to recognize the user's request and then respond through some appropriate action, such as, for example, providing a particular audio speech output or updating a database in a particular way.

Most of the research and development in the field of dialogue systems has been in the area of "domain-specific" applications, wherein the system's dialogue manager has been specifically trained for a somewhat narrowly defined task, and has been previously set up by a skilled computer system design engineer. Examples have included, inter alia, weather reports, airline travel information systems, and banking services. In these cases, the user cannot define the application, being limited to the restricted options offered by the system.

More recently, however, a limited number of domain-independent systems have been described in which a user can cause the system to generate a dialogue for a particular (i.e., domain-specific) application automatically, without the need for a computer system design engineer. For example, U.S. Pat. No. 4,688,195, issued to Craig W. Thompson et al. (Hereinafter "Thompson et al."), describes a "system for interactively generating a natural-language input interface, without any computer-skill programming work being required." (See Thompson et al., abstract.) In particular, Thompson et al. describes, inter alia, a system which generates a user-customized natural language menu interface from a user-supplied database and from inputs supplied interactively by the user. More specifically, the system generates a domain-dependent context-free grammar by combining a domain-independent grammar and lexicon with a domain specification for a predetermined application.

However, in all of these prior art systems, including Thompson et al., the dialogue which is provided (whether "manually" generated by a skilled computer system design engineer, or "automatically" generated by a dialogue generation system based on a given user's input) is static. That is, once created, the dialogue is not responsive to the ever-changing external environment. For example, even when a dialogue is generated responsive to a user's desires and expectations, the available information upon which specifics of the dialogue may be based (e.g., the set of available documents retrieved in response to an appropriate search query posed over the Internet's World Wide Web) is fixed at the time the dialogue is generated. Thus, as the available external information changes, the dialogues generated by these prior art systems become rapidly outdated.

SUMMARY OF THE INVENTION

In accordance with the principles of the present invention, a customized method or algorithm for holding an interactive dialogue session between a (human) user and a machine (hereinafter referred to simply as a "dialogue") is generated, such that the resulting dialogue advantageously responds to the user's requests and wherein the system's capability (i.e., the dialogue) is automatically modified thereafter based on dynamically changing external databases. Specifically, a computer system acts as a Dialogue Generator agent by creating such a customized dialogue consisting of services that are organized and presented in a form that is a combination of the user's expectations and the system's capabilities. In particular, the system's capabilities advantageously include the information content of database/service providers (such as, for example, a distributed information source such as the Internet's World Wide Web or a corporate file system), and the Dialogue Generator advantageously modifies the dialogue periodically in response to this dynamically changing external environment.

More specifically, the present invention consists of a method and apparatus for generating a human-machine dialogue comprising steps or modules for receiving a user request comprising at least one topic of interest; retrieving from an external database at a first point in time, a first set of documents comprising information relating to the at least one topic of interest; generating a human-machine dialogue based on the information comprised in said first set of documents; retrieving from the external database at a second point in time later than said first point in time, a second set of documents comprising information relating to the at least one topic of interest, the information comprised in said second set of documents having at least one difference from the information comprised in said first set of documents; and modifying the human-machine dialogue based on the information comprised in said second set of documents.

DETAILED DESCRIPTION OF THE PREFERRED EMBODIMENT

Introduction

Figure 1:
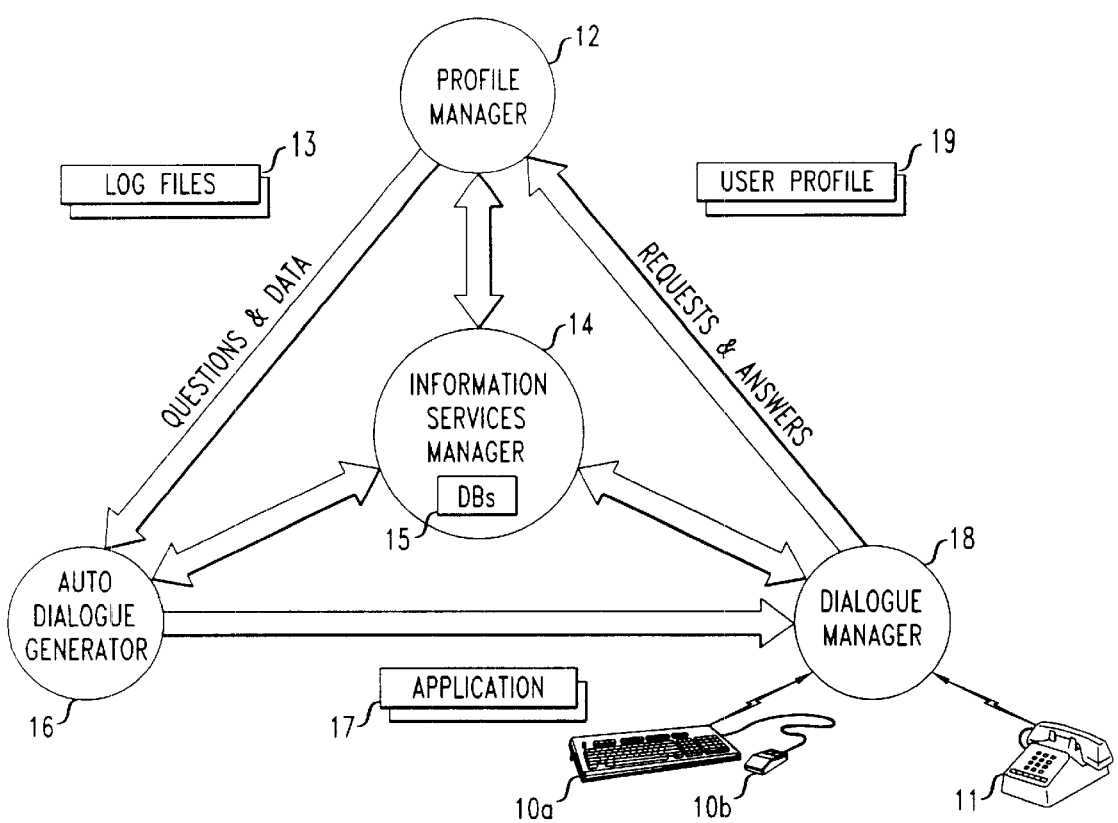
FIG. 1 shows a system for performing automated dynamic dialogue generation in accordance with the preferred embodiment of the present invention.

In accordance with the preferred embodiment of the present invention, a dialogue is formed by first determining the user's preferences in a question and answer session. Then, the resulting "user profile" is combined with the system's capabilities (e.g., the state of an external database) to generate a customized application which provides a dialogue session, with associated services, that specifically meet the user's needs. Advantageously, the resulting application is thereby unique to the user, both in topical content as well as in presentation format. In the preferred embodiment of the present invention, this is accomplished through the use of four illustrative software modules: a Profile Manager, an Information Services Manager, an Auto Dialogue Generator, and a Dialogue Manager.

By way of explanation, the following describes a typical illustrative scenario in which the present invention may be advantageously employed. A user wishes to access several services over a cell-phone from an automobile, including, for example, calling a friend by speaking his name; getting the latest sports reports on auto racing or sailing; listening to the user's most recent email messages; and finding out the weather forecast for several international cities. Advantageously, the user's preferences were previously obtained in an initial question and answer session with the Profile Manager. The Auto Dialogue Generator built an initial dialogue that was invoked by the Dialogue Manager when the user accessed the service. The Profile Manager then updated the profile so that future sports reports containing game scores are presented first. The Auto Dialogue Generator then created a new dialogue (which it may, for example, do automatically on a periodic basis), taking into account the latest changes in the various World Wide Web databases (such as, for example, an updated weather forecast, etc.). The new dialogue includes a new organizational form that includes the latest services requested by the user, new information content downloaded from external databases, and new grammars that specifically address the altered messages and documents received from external databases. The user calls in and the subsequent human-machine dialogue is handled by the Dialogue Manager, resulting in the delivery of information and services to the user in a format that the user prefers.

The following describes certain key points of the illustrative system of the preferred embodiment. First, the system advantageously generates a user profile for the particular user. The user profile encodes a model of the given user. A question and answer session is used to generate the initial user profile which includes such preferences as services, topics and attributes of interest, presentation formats, etc. The user profile may also encode other pieces of information about the user such as, for example, general interests and hobbies, preferences, goals, and current activities (such as, for example, trips that the user may be taking, etc.) This allows the agent to collect and volunteer information for which the user may not have explicitly asked. The agent may also keep certain pieces of personal and/or sensitive information about the user (e.g., a social security number for credit/loan applications) which is released to trusted agents under certain conditions.

Next, there is the extraction of relevant information and services. Specifically, in a networked environment, for example, there may be a vast number of services and amount of information available. The personal agent uses its knowledge of the user, encoded in the user profile, to collect, prune, and organize the available information and services, creating a subset of services/information that the user wants. For example, information potentially of interest to the user may be extracted from the World Wide Web and stored. In accordance with the principles of the present invention, information extraction can occur continually in the background, overnight, periodically, on notification by another computer agent, and/or at the specific request of the user for updated information.

Next there is the issue of the organization and presentation of the information/services to the user. In particular, after pruning the information to match the user's interests, the data is advantageously organized and structured in a way that can be presented to the user through a natural dialogue. The structuring and the data presentation style are also tailored to fit the user's preferences. For example, the system knows the user's preferences regarding the order of presentation, the amount of detail, options, etc., and it may volunteer actions and other pieces of information to the user. Thus, the data is advantageously organized in such a way as to let the user get the essential information, but that also allows the user to ask for more information in a natural and efficient manner. In addition, the grammars are updated to include words of high information content in the latest downloaded documents.

The advantageous tailoring of computer agents and machine-human interaction to each user is important. The goal is to match expectations of the user and the agent so that they dovetail and work together harmoniously. To help accomplish this (as described above), the machine "knows" the user by keeping track of a model of the user as encoded in the user profile. Thus, the user and the agent can advantageously inform each other of any misunderstanding. By way of example, possible misunderstandings include the case where the agent delivers incorrect information and/or an inappropriate amount of information to the user, or the case where the user has incorrect or obsolete perceptions of the agent's capabilities.

Finally, the agent advantageously monitors its interaction with the user, determining any changes in the user's behavior and thereby dynamically modifying the user profile. The agent can present alternative options to the user to make the dialogue interface more appropriately tuned to the user behavior. The agent can also routinely update the user with new services recently incorporated and request the user to modify the user profile if desired. The user may also request changes to the profile explicitly, such as, for example, deleting or adding a particular topic of interest or changing the presentation format.

Overview of the Major System Components

FIG. 1 shows an illustrative system for performing automated dynamic dialogue generation in accordance with the preferred embodiment of the present invention. There are four main components to the illustrative system—Profile Manager 12, Information Services Manager 14, Auto Dialogue Generator 16, and Dialogue Manager 18. Profile Manager 12 generates and maintains User Profile 13, a model of the user's intent, both in types of services desired, as well as in preferences for service organization and presentation. Information Services Manager 14 keeps track of the services/capabilities of the system as well as the information contained in one or more accessible Databases 15. These databases may, for example, include internal library databases, as well as external databases such as the World Wide Web or other external information sources. Information Services Manager 14 is also responsible for downloading and organizing the information for presentation to the user. Auto Dialogue Generator 16 uses the user profile and the identified set of available services/information to generate Application 17—a user-customized set of Dialogue States that define possible dialogue flow between the user and the system. Note that the uniqueness of the application is manifested in the dialogue flow which includes both the types of services and data presented, as well as the manner in which the data are presented and the services are delivered. Using the dialogue flow specification generated by Auto Dialogue Generator 16, Dialogue Manager 18 manages the dialogue flow, using a generalized interface between the user and the computer system. In particular, the interface may enable communication via voice (represented by telephone set 11), keyboard (represented by keyboard 10*a*), mouse (represented by mouse 10*b*), etc. Finally, Dialogue Manager 18 also advantageously monitors the dialogue and user behavior, communicating such information via Log Files 19 to Profile Manager 12, which may, in turn, modify User Profile 13, and, as a result, future dialogue sessions, where appropriate.

Profile Manager

In accordance with the preferred embodiment of the present invention, the Profile Manager generates and maintains a User Profile, which contains knowledge about the user's intent, both in types of services desired, as well as in preferences for service organization and presentation. The user profile advantageously encodes a model of the user, making it possible to customize an application for each user. A question and answer session may be used to generate the initial User Profile that includes such preferences as services, topics and attributes of interest, presentation formats, etc. The User Profile may also encode other pieces of information of the user such as general interests and hobbies, preferences, goals, and current activities (such as trips that the user may be taking, etc.). This allows the agent to collect and volunteer information that the user may not have explicitly asked for. The agent may also keep certain pieces of sensitive/personal information of the user (e.g., social security number for credit/loan application) which is released to trusted agents under certain conditions.

The Profile Manager advantageously collects three main types of information about the user—a set of topics, subtopics, and keywords, as well as the desired presentation format. Examples of services and topics the user may be interested in may include, for example, name dialing, e-mail reading, news headlines, sports news, stock quotes and weather. Examples of attributes that describe the way information and services are presented include "personal," "statistical," "historical," "predictive" or "opinion." Examples of possible presentation formats include the entire document, the most relevant paragraph, or a twenty second summary of the document.

The Profile Manager advantageously monitors subsequent dialogue sessions, tracking the user behavior and modifying the user profile as needed. In accordance with the preferred embodiment of the present invention, the Information Services Manager (see below) provides the Profile Manager with information about what capabilities/services and information are available. The Profile Manager may request the Information Services Manager to perform some action on the World Wide Web on the user's behalf, such as search for a new information service or register on a particular web site. The Profile Manager may then inform the user (through the Dialogue Manager—see below) of the choices and may allow the user to specify what services/information are desired. The user's application can then be advantageously modified in order to be more efficient, delivering the requested services and information more readily in an updated form, with a new dialogue flow.

The system advantageously accepts requests from the user to update the profile explicitly. The system may also present alternative options to the user to make the dialogue interface tuned to the user's specific behavior. It may also routinely update the user with new services recently incorporated and may allow the user to modify the user profile if desired.

Figure 2:
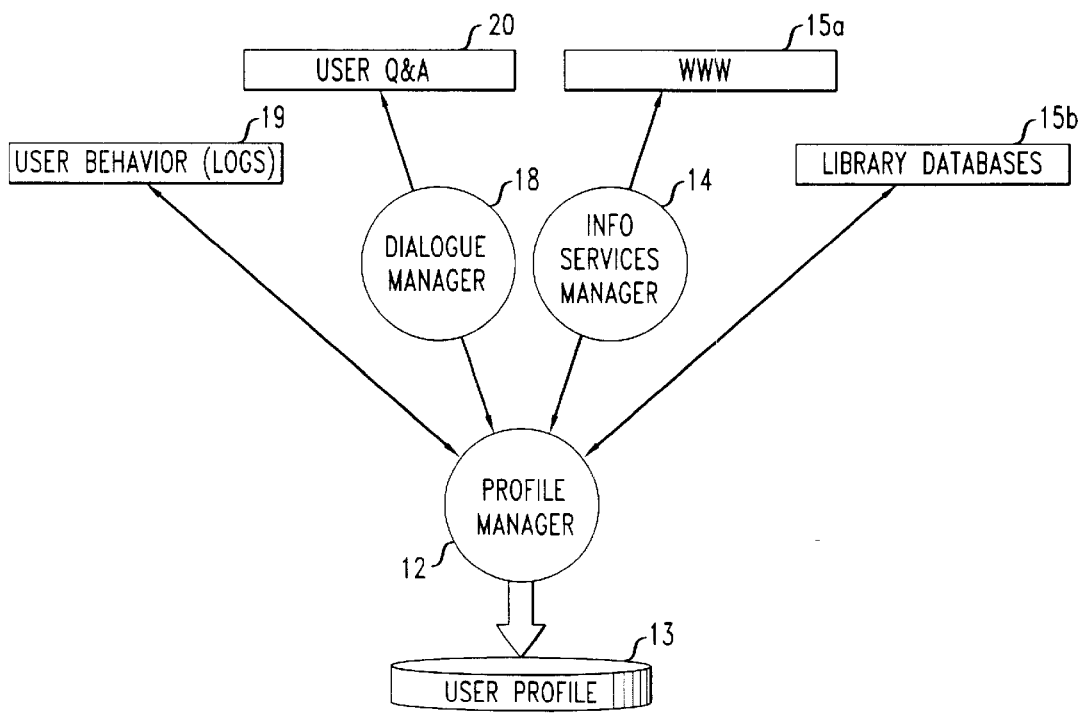
FIG. 2 shows the operation of the Profile Manager module of the illustrative system of FIG. 1.

More specifically, and as illustratively shown in FIG. 2, Profile Manager 12 generates and updates User Profile 13, which allows for the customization of the application for each given user. Information Services Manager 14 provides the Profile Manager with information about what capabilities/services and information are available (e.g., fax, email, voice-mail, World Wide Web information and transactions, etc.), through reference, for example, to the World Wide Web (WWW 15*a*). In addition, Library Databases 15*b* are advantageously available to the Profile Manager. The Profile Manager informs the user (through Dialogue Manager 18) of the available choices and advantageously allows the user to specify what services and information are desired. Moreover, as described above, the user may, by way of example, request the following desired services: name dialing, world weather reports, stock quote services, sports report retrieval and e-mail. The user may also specify various keywords within the selected information services such as, for example, "McGwire" for sports report retrieval.

The interaction between the user and the Profile Manager is illustratively performed with the use of User Question and Answer Session 20. In addition, the Profile Manager may ask the user general questions about his or her interests and preferences, which may include the user's preferred presentation format(s). For example, the user may request that the system include top news stories, present lists of titles, or prune documents to provide a summary thereof. The Profile Manager may also request the Information Services Manager to perform some action(s) on the World Wide Web, such as, for example, retail transactions. In addition, the Profile Manager may make suggestions for particular profile modifications, based on (a) the input received from the user, (b) past user behavior, and/or (c) system capabilities.

Some of the information which the Profile Manager advantageously stores in the user profile includes, inter alia, (a) a list of services or topics that the user is interested in, such as, for example, name dialing, reading e-mail, and retrieving news headlines, sports news, stock quotes, weather information, etc.;

(b) a list of keywords or concepts which may be used to search information databases for the most relevant documents;

(c) a set of attributes that describe the way information and services are to be presented, the attributes including, for example, "personal," "statistical," "historical," "predictive," and "opinion" attributes;

(d) a model of user priorities for ranking the information to be presented to the user;

(e) a specification for how the user wants information to be presented for various types of information, such as, for example, only briefs (i.e., summaries) or full text; and (f) a model of future user goals derived from previous service requests gleaned from the dialogue history.

In accordance with the preferred embodiment of the present invention, during the course of interaction of the user with the system, the system advantageously monitors, inter alia, the number of times sites and/or services are accessed, attributes of information requested by the user, dialogue history including flow between dialogue states, etc. This information results in User Behavior Log Files 19, which may be used to automatically update the user profile as the system learns more about the user's habits, and also as the various databases involved are updated. The user's application can then be advantageously modified in order to be more efficient, delivering the requested services and information more readily in an updated form, with a new dialogue flow.

In accordance with the preferred embodiment of the present invention, the system accepts requests from the user to update the profile explicitly, and may present alternative options to the user to make the dialogue interface better tuned to the user's specific behavior. Moreover, the system also may advantageously update the user routinely with new recently incorporated services, and may allow the user to modify the user profile if desired.

Finally, in certain illustrative embodiments of the present invention, the system may embody the User Profile as a customizable "web portal" on the World Wide Web. And in alternative illustrative embodiments, the system may advantageously use an existing web portal as a representation of either all, or just a portion of, the User Profile. (The creation and use of web portals is fully familiar to those of ordinary skill in the art.)

Information Services Manager

In a networked environment, there is a vast number of services and amount of information available. In accordance with the preferred embodiment of the present invention, the Information Services Manager advantageously uses its knowledge of the user, encoded in the User Profile, to collect, prune, and organize the available information and services, creating a subset of services/information that the user wants. For example, information potentially of interest to the user may be extracted from the World Wide Web and stored. In accordance with the principles of the present invention, this information extraction may, for example, occur continually in the background, overnight, periodically, on notification by another computer agent, or at the request of the user for updated information.

The Information Services Manager of the preferred embodiment of the present invention is also advantageously responsible for organizing the information for presentation to the user. In particular, the Information Services Manager may organize the requested services and information in a hierarchical format for easy access and retrieval, sending this information to the Auto Dialogue Generator (see below). By way of example, any of the following criteria may be advantageously used—type of service or topical content of information (e.g., weather reports, e-mail messages, banking transactions, etc.), attributes the information/service must contain (e.g., "statistical," "biographical," "historical," etc.), order and priority of presentation, and/or quantity of information to be delivered (e.g., briefs, the first line of each paragraph, the full report, etc.).

Figure 3:
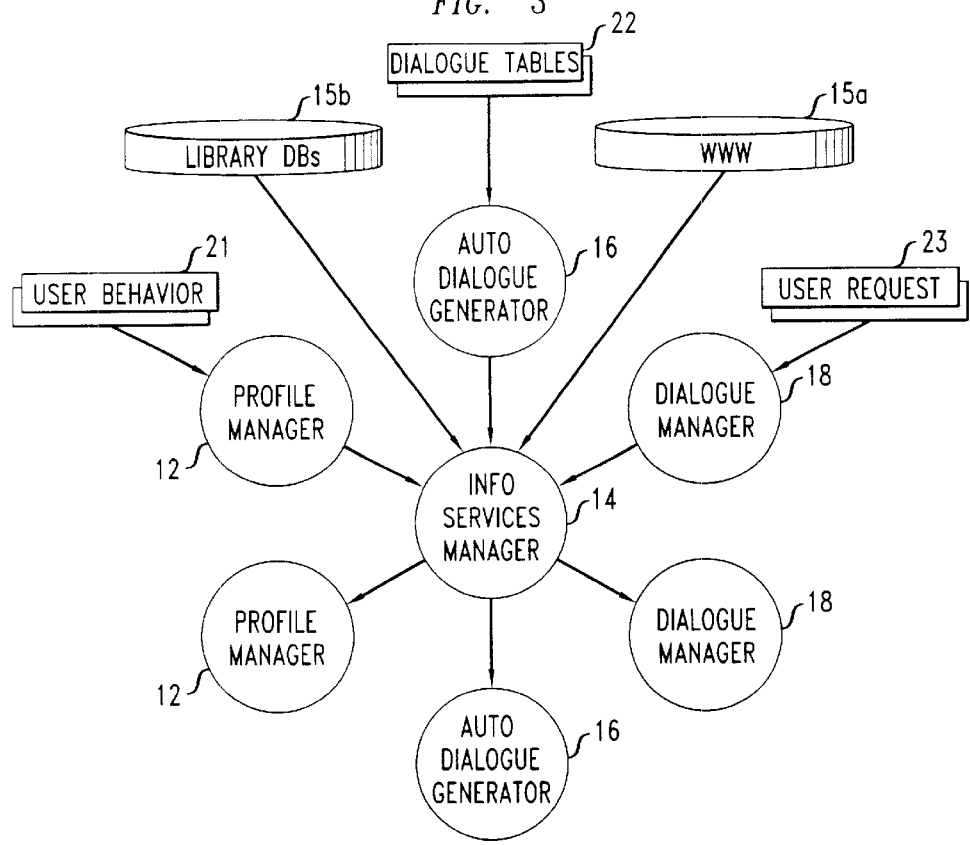
FIG. 3 shows the operation of the Information Services Manager module of the illustrative system of FIG. 1.

More specifically, and in accordance with the preferred embodiment of the present invention as illustratively shown in FIG. 3, Information Services Manager 14 retrieves documents, e-mail, etc., from a dynamically changing external world. In particular, the illustrative Information Services Manager advantageously performs several major functions, which may include, inter alia, (a) keeping track of the capabilities of the system and the information available on World Wide Web 15a, and informing Profile Manager 12 of the services/information available (particularly as such available information changes);

(b) searching and downloading information of interest to the user based on the user profile (i.e., known to those skilled in the art as "data-mining");

(c) organizing the data in hierarchical format for easy access and retrieval;

(d) structuring and formatting the presentation of information according to the user's preferences, and providing a corresponding input to Auto Dialogue Generator 16; and (e) handling user requests such as user request 23 for more information.

In accordance with the preferred embodiment of the present invention, the Information Services Manager creates specific grammar components for each particular set of information which it has retrieved, organized, structured and formatted. In particular, these grammar components are advantageously supplied as the input to Auto Dialogue Generator 16, as described above.

Auto Dialogue Generator

In accordance with the preferred embodiment of the present invention, the Auto Dialogue Generator advantageously uses the user profile and set of available services/information to generate a user-customized set of Dialogue States (an "application") that defines the possible dialogue flow between the user and the system. The uniqueness of the application is manifested in a dialogue flow that incorporates both the types of services and data presented, as well as the manner in which the data are presented and the services are delivered. The illustrative Auto Dialogue Generator advantageously combines three sources of information—the User Profile, information retrieved by the Information Services Manager, and a library that may contain, for example, tables of information such as sub-grammars, search word clusters, and URL (Universal Resource Locator) addresses, each of which is familiar to those skilled in the art. These three sources may then be used to generate the user specific dialogue flow, enabling the user to query and extract information from his or her desired collection of services.

In accordance with the preferred embodiment of the present invention, the dialogue flow specification is generated automatically and includes a connected graph of dialogue states that are organized according to some particular criteria. In particular, each of these states may consist of a set of tables that include information related to performing various actions. Illustratively, there are two types of actions—dialogue-related and application-related. The dialogue-related parameters may include, for example, audio and/or textual prompts, help states, grammars with associated vocabularies, and syntactic structure. The application-related parameters may include, for example, URL addresses for information retrieval via the World Wide Web, rules for performing sets of possible actions (such as, for example, phone numbers associated with individual names), and system-specific parameters such as audio input and/or output options or language preferences.

Figure 4:
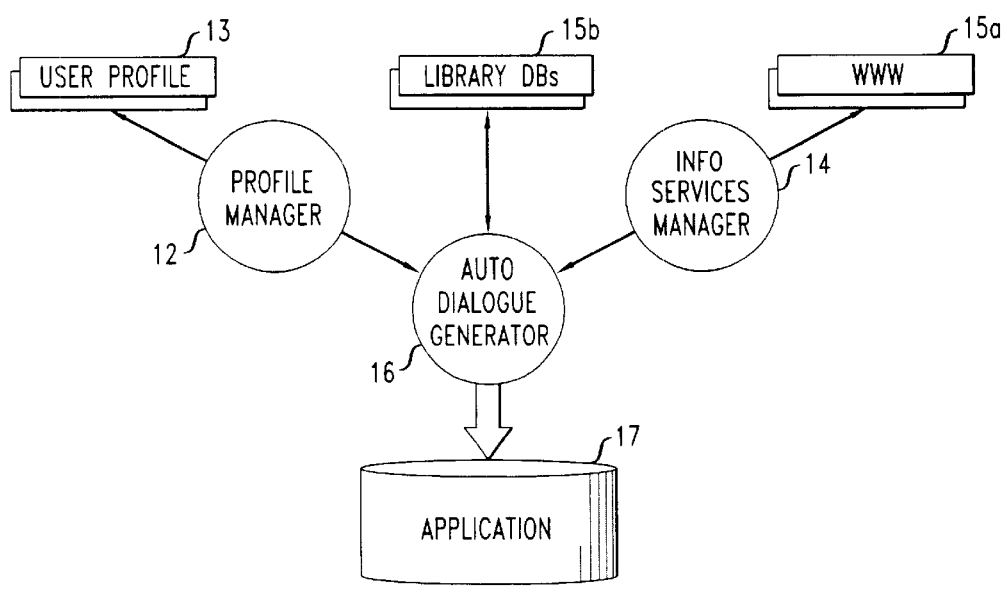
FIG. 4 shows the operation of the Auto Dialogue Generator module of the illustrative system of FIG. 1.

More specifically, in accordance with the preferred embodiment of the present invention as illustratively shown in FIG. 4, Auto Dialogue Generator 16 advantageously combines three sources of information:

(a) user profile 13, provided to Auto Dialogue Generator 16 by Profile Manager 12;

(b) information retrieved and organized by Information Services Manager 14 from the most recent database (such as, for example, an information service accessed over the Internet such as World Wide Web database 15a); and (c) a library containing domain dependent and domain independent components, illustratively shown in FIG. 4 as Library Databases 15b. Examples of domain dependent components include, inter alia, a list of city names, a list of corporate names with associated phone numbers, parsing information for a particular website, etc. Examples of domain independent components include, inter alia, tables of sub-grammars, search word clusters, URL addresses, etc.

In particular, the Auto Dialogue Generator advantageously uses these three sources to generate Application 17, comprising the user specific dialogue flow, which, for example, enables the user to query and extract information from his or her desired set of services. Advantageously, the dialogue flow specification is generated automatically and includes a connected graph (such as a tree structure) of Dialogue States, each including dialogue-related parameters and application-related parameters, as described above.

In accordance with the principles of the present invention, the Auto Dialogue Generator subsystem periodically creates a new, updated dialogue for the user, presenting the requested services and information in a customized format that matches the user's preferences with the available formats of the requested services and/or information. This update may occur at regular, defined intervals, or may be responsive to updated information in the referenced databases such as the World Wide Web.

In certain illustrative embodiments of the present invention, Application 17 may be embodied as a personalized "speech portal" to the information and services of the World Wide Web. (Note again that "web portals" are familiar to those of ordinary skill in the art.) The Application may itself reside on the World Wide Web, and it may comprise a set of one or more web pages. Additionally, Application 17 can provide an alternative, and parallel, access to information defined by existing, and customizable, web portals.

In various illustrative embodiments of the present invention, Application 17, as generated by the Auto Dialogue Generator, may comprise a tree-based dialogue session, a form-based dialogue session, a connected graph-based dialogue session, or a dynamic stateless engine-based dialogue session, each of which is familiar to those of ordinary skill in the art. More specifically, Auto Dialogue Generator 16 advantageously creates grammars for recognition of the user's specific requests, which may, in various alternative embodiments of the present invention, be made by text (e.g., as typed on a keyboard) and/or by speech. In the latter case, it may be assumed that the Dialogue Manager includes speech recognition capability, which may be conventional (see below).

Dialogue Manager

In accordance with the preferred embodiment of the present invention, the Dialogue Manager provides a speech interface between the user and the system using the dialogue flow specification generated by the Auto Dialogue Generator. This speech interface may be conventional and will be familiar to those skilled in the art. For example, the speech interface can be based on the system described in "A. Pargellis, Q. Zhou, A. Saad, C.-H. Lee, "A Language for Creating Speech Applications," ICSLP'98 (Sydney, Australia, November 1998), which publication is hereby incorporated by reference as if fully set forth herein.

Specifically, the dialogue generated by the Auto Dialogue Generator advantageously allows, inter alia, the performance of functions such as querying the database, switching between services and databases, mixed initiative, accessing help routines, and an option to update the personal user's profile. For example, this may be accomplished with the Speech Technology Integration Platform specifically described in "A Language for Creating Speech Applications" referenced above. In particular, and as described in detail in the referenced publication, this prototype platform integrates various speech technology components including speech recognizers (including multiple types—finite-state/ context-free, n-gram natural language, and multi-lingual— each familiar to those skilled in the art), text-to-speech synthesizers (multi-lingual), an audio/telephony interface, grammar generation tools, and a web client interface. Each of these components is conventional and is familiar to those of ordinary skill in the art.

More specifically, the system described in "A Language for Creating Speech Applications" is based on a three-tier client-server architecture where the resource manager manages available service components and distributes these services to applications through a client application-programming interface. By using this interface, a developer can advantageously create a speech user interface application without knowing the details of speech technology, audio or telecommunication interface hardware.

In particular, each application may be interfaced to the aforementioned client application-programming interface through the Dialogue Manager and the Application Manager. This advantageously provides a high level, intuitive interface for controlling the dialogue flow in a speech application prototype. The libraries consist of Voice Interface Language commands, each one of which is an encapsulation of a software routine that performs some set of dialogue and application related actions. These functions enable a developer to easily control the Dialogue flow between a human and computer at many different levels. For example, the developer can fine-tune the Speech Recognizer for a particular application, generate a multilingual dialogue flow, access web sites over the Internet, and log system and dialogue information in order to trace dialogue sessions. In all cases, the same set of domain independent Voice Interface Language commands is used, with application specific arguments customizing the system.

Figure 5:
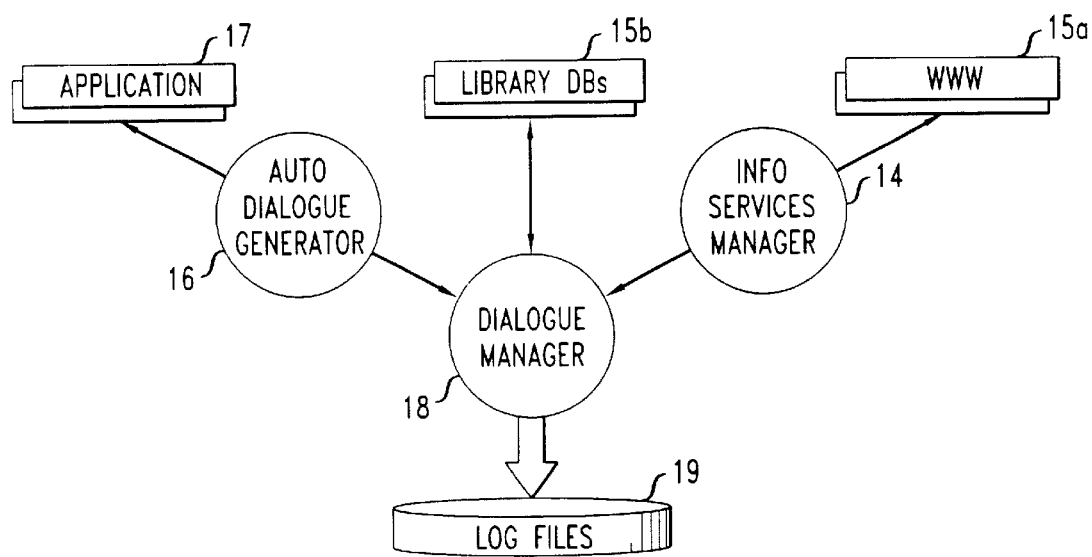
FIG. 5 shows the operation of the Dialogue Manager module of the illustrative system of FIG. 1.

In accordance with the preferred embodiment of the present invention, the Dialogue Manager is, therefore, advantageously a part of a Voice User interface platform, such as, for example, the Voice User Interface platform described in the above-referenced publication, "A Language for Creating Speech Applications." Specifically, Dialogue Manager 18 comprises an interface between the user and various application and dialogue functions such as, for example, database access and modification (e.g., internet file servers, etc.), speech recognition (potentially in any one of several languages), speech synthesis (in some particular selected language), etc. (Note that speech recognition and speech synthesis, both familiar to those of ordinary skill in the art, may be realized by conventional means.) As illustrated in FIG. 5, Dialogue Manager 18 uses the dialogue specification generated by Auto Dialogue Generator 16. The dialogue generated by the Auto Dialogue Generator will advantageously include capabilities including, inter alia, querying the database, switching between services and databases, mixed initiative, invoking help routines, updating personal profiles, etc. Some of the specific functions include, inter alia, flow between dialogue states, error detection and handling, dialogue history, and keeping a log of dialogue sessions (in Log Files 19). Regarding the error handling function, for example, the Dialogue Manager may advantageously (a) provide help sessions, (b) make suggestions to the user if the dialogue becomes stuck," and/or (c) go back to a previous part of the session.

Addendum

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A computer based automated method for generating a dynamic human-machine dialogue comprising the steps of:
   receiving user profile information for a user;
   receiving a user request comprising at least one topic of interest;
   retrieving from an external database at a first point in time, a first set of documents comprising information relating to the at least one topic of interest;
   generating a user-customized human-machine dialogue based in part on the user profile information and in part on the information comprised in said first set of documents, said user-customized human-machine dialogue including an automatically generated dialogue flow specification;
   retrieving from the external database at a second point in time later than said first point in time, a second set of documents comprising information relating to the at least one topic of interest, the information comprised in said second set of documents having at least one difference from the information comprised in said first set of documents; and
   automatically modifying the dialogue flow specification of the human-machine dialogue based on the information comprised in said second set of documents so that said dialogue has a new organizational form that includes a set of latest services requested by the user, new information content downloaded from the external database, and a new grammar that specifically addresses said at least one difference.

2. The method of claim 1 wherein the external database comprises the World Wide Web.

3. The method of claim 1 wherein the user request further comprises information relating to a desired presentation format of said information comprised in said first and second sets of documents, and wherein said information comprised in said first and second sets of documents is formatted based on said desired presentation format.

4. The method of claim 1 wherein said second set of documents comprises one or more modified versions of said first set of documents.

5. The method of claim 1 wherein said second set of documents comprises at least one document which was not included in said first set of documents.

6. The method of claim 1 wherein the human-machine dialogue comprises a text-based input interface.

7. The method of claim 1 wherein the human-machine dialogue comprises a voice-based input interface and includes speech recognition capability.

8. The method of claim 1 wherein the human-machine dialogue comprises a text-based output interface.

9. The method of claim 1 wherein the human-machine dialogue comprises a speech-based output interface and includes speech synthesis capability.

10. The method of claim 1 wherein the user request further comprises one or more keywords related to said at least one topic of interest.

11. The method of claim 1 wherein each of the steps of generating and modifying the human-machine dialogue comprises the creation of one or more grammars.

12. The method of claim 1 wherein the human-machine dialogue comprises a tree-based dialogue session.

13. The method of claim 1 wherein the human-machine dialogue comprises a form-based dialogue session.

14. The method of claim 1 wherein the human-machine dialogue comprises a connected graph-based dialogue session.

15. The method of claim 1 wherein the human-machine dialogue comprises a dynamic stateless engine-based dialogue session.

16. An automated human-machine dialogue system comprising:
   a profile manager which receives a user request comprising at least one topic of interest;
   an information services manager which retrieves from an external database at a first point in time, a first set of documents comprising information relating to the at least one topic of interest, and which further retrieves from the external database at a second point in time later than said first point in time, a second set of documents comprising information relating to the at least one topic of interest, the information comprised in said second set of documents having at least one difference from the information comprised in said first set of documents;

an auto dialogue generator which generates a human-machine dialogue based on the information comprised in said first set of documents, and which further modifies the human-machine dialogue based on the information comprised in said second set of documents so that said dialogue has a new organizational form that includes a set of latest services requested by the user, new information content downloaded from the external database, and a new grammar that specifically addresses said at least one difference; and a dialogue manager which manages the human-machine dialogue.

17. The system of claim 16 wherein the external database from which the information services manager retrieves said first and second sets of documents comprises the World Wide Web.

18. The system of claim 16 wherein the user request received by the profile manager further comprises information relating to a desired presentation format of said information comprised in said first and second sets of documents, and wherein said information comprised in said first and second sets of documents is formatted based on said desired presentation format.

19. The system of claim 16 wherein said second set of documents comprises one or more modified versions of said first set of documents.

20. The system of claim 16 wherein said second set of documents comprises at least one document which was not included in said first set of documents.

21. The system of claim 16 wherein the dialogue manager comprises a text-based input interface.

22. The system of claim 16 wherein the dialogue manager comprises a voice-based input interface and includes a speech recognizer.

23. The system of claim 16 wherein the dialogue manager comprises a text-based output interface.

24. The system of claim 16 wherein the dialogue manager comprises a speech-based output interface and includes a speech synthesizer.

25. The system of claim 16 wherein the user request received by the profile manager further comprises one or more keywords related to said at least one topic of interest.

26. The system of claim 16 wherein the auto dialogue generator creates one or more grammars.

27. The system of claim 16 wherein the auto dialogue generator generates a human-machine dialogue which is comprised of a tree-based dialogue session.

28. The system of claim 16 wherein the auto dialogue generator generates a human-machine dialogue which is comprised of a form-based dialogue session.

29. The system of claim 16 wherein the auto dialogue generator generates a human-machine dialogue which is comprised of a connected graph-based dialogue session.

30. The system of claim 16 wherein the auto dialogue generator generates a human-machine dialogue which is comprised of a dynamic stateless engine-based dialogue session.

31. An apparatus for automatically generating a human-machine dialogue comprising:

means for receiving a user request comprising at least one topic of interest;

means for retrieving from an external database at a first point in time, a first set of documents comprising information relating to the at least one topic of interest;

means for generating a human-machine dialogue based on the information comprised in said first set of documents;

means for retrieving from the external database at a second point in time later than said first point in time, a second set of documents comprising information relating to the at least one topic of interest, the information comprised in said second set of documents having at least one difference from the information comprised in said first set of documents; and means for modifying the human-machine dialogue based on the information comprised in said second set of documents so that said dialogue has a new organizational form that includes a set of latest services requested by the user, new information content downloaded from the external database, and a new grammar that specifically addresses said at least one difference.

32. The apparatus of claim 31 wherein the external database comprises the World Wide Web.

33. The apparatus of claim 31 wherein the user request further comprises information relating to a desired presentation format of said information comprised in said first and second sets of documents, and wherein said information comprised in said first and second sets of documents is formatted based on said desired presentation format.

34. The apparatus of claim 31 wherein said second set of documents comprises one or more modified versions of said first set of documents.

35. The apparatus of claim 31 wherein said second set of documents comprises at least one document which was not included in said first set of documents.

36. The apparatus of claim 31 wherein the human-machine dialogue comprises a text-based input interface means.

37. The apparatus of claim 31 wherein the human-machine dialogue comprises a voice-based input interface means and includes means for performing speech recognition.

38. The apparatus of claim 31 wherein the human-machine dialogue comprises a text-based output interface means.

39. The apparatus of claim 31 wherein the human-machine dialogue comprises a speech-based output interface means and includes means for performing speech synthesis.

40. The apparatus of claim 31 wherein the user request further comprises one or more keywords related to said at least one topic of interest.

41. The apparatus of claim 31 wherein the means for generating and modifying the human-machine dialogue each comprise means for creating one or more grammars.

42. The apparatus of claim 31 wherein the human-machine dialogue comprises means for performing a tree-based dialogue session.

43. The apparatus of claim 31 wherein the human-machine dialogue comprises means for performing a form-based dialogue session.

44. The apparatus of claim 31 wherein the human-machine dialogue comprises means for performing a connected graph-based dialogue session.

45. The apparatus of claim 31 wherein the human-machine dialogue comprises means for performing a dynamic stateless engine-based dialogue session.

* * * * *